(No Model.) 2 Sheets—Sheet 2.

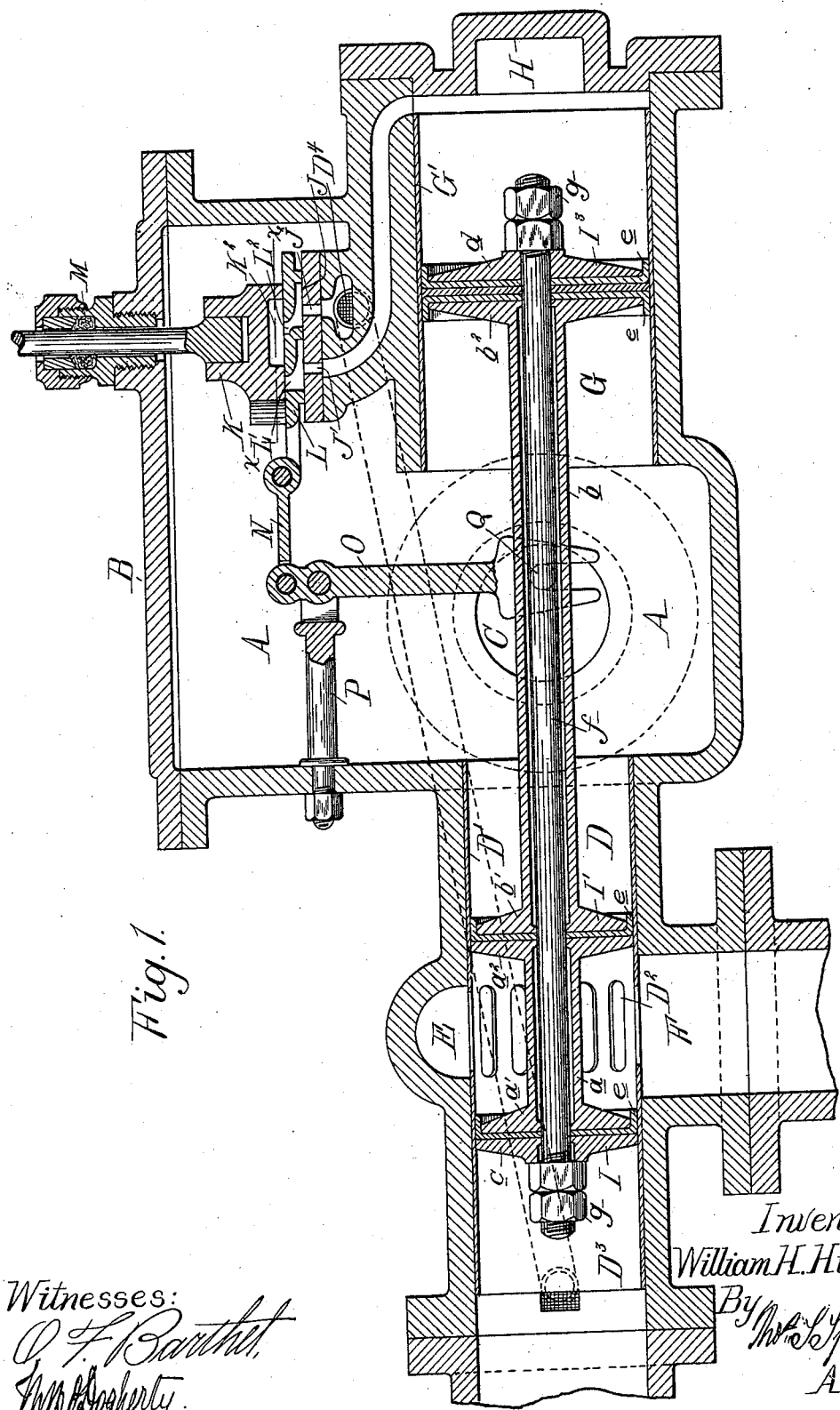

W. H. HULTGREN.
VALVE FOR HYDRAULIC ELEVATORS.

No. 577,958. Patented Mar. 2, 1897.

Witnesses:
O. F. Barthel
Walter Dogherty

Inventor:
William H. Hultgren,
By Thos. Sprague & Son,
Attorneys.

UNITED STATES PATENT OFFICE.

WILLIAM H. HULTGREN, OF DETROIT, MICHIGAN, ASSIGNOR OF ONE-HALF TO THE GARDNER ELEVATOR COMPANY, OF SAME PLACE.

VALVE FOR HYDRAULIC ELEVATORS.

SPECIFICATION forming part of Letters Patent No. 577,958, dated March 2, 1897.

Application filed November 4, 1895. Serial No. 567,845. (No model.)

*To all whom it may concern:*

Be it known that I, WILLIAM H. HULTGREN, a citizen of the United States, residing at Detroit, in the county of Wayne and State of Michigan, have invented certain new and useful Improvements in Valves for Hydraulic Elevators, of which the following is a specification, reference being had therein to the accompanying drawings.

My invention relates to a valve especially designed to be used for controlling the water supply and exhaust of a hydraulic elevator; and the invention consists in the peculiar construction, arrangement, and combination of parts, as more fully hereinafter described.

Figure 3:
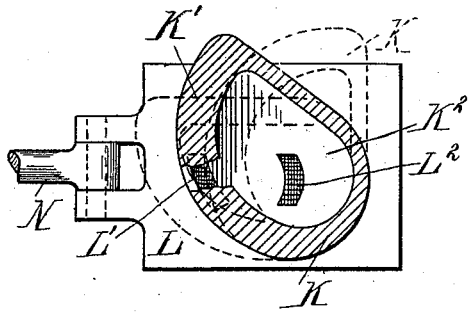
Figure 2:
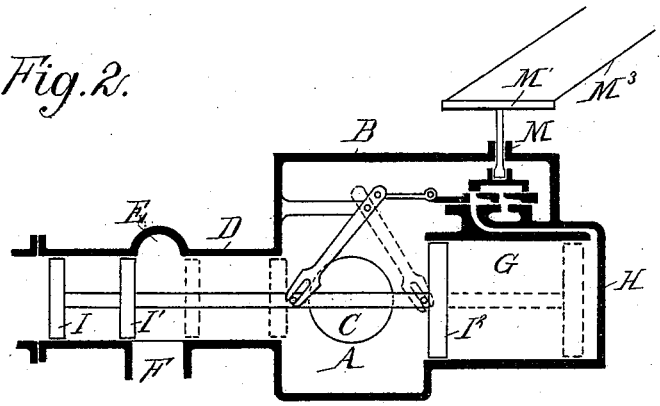
Figure 4:
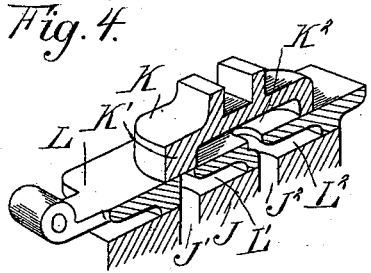
Figure 5:
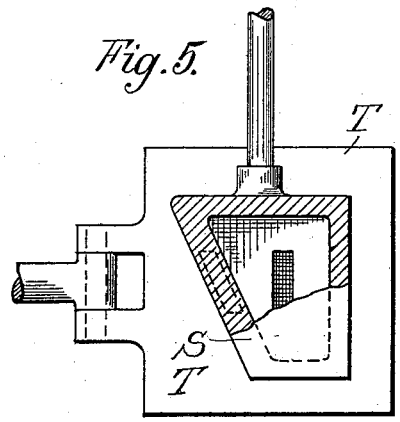

In the drawings, Figure 1 is a vertical central longitudinal section through a valve embodying my invention. Fig. 2 is a diagram section similar to Fig. 1, but showing the parts in a different position. Fig. 3 is a horizontal section through the pilot-valve on line $x\,x$, Fig. 1. Fig. 4 is a sectional perspective view of the pilot-valve and cut-off. Fig. 5 is a sectional plan view of a modified form of pilot-valve.

A is a water-chest provided with a removable cover B.

C is a water-inlet, which may be connected with any source of water-supply.

D is a cylindrical extension of the chest, forming an outlet therefor and having an annular enlargement E, connecting with the lateral discharge-pipe F, which leads to the operating-cylinder of the elevator.

Arranged in alinement with the cylinder D and preferably also forming an integral part of the chest is the cylinder G. This cylinder is of greater diameter than the cylinder D and is provided at its outer end with the cover H, its inner end opening into the main part of the chest. Both cylinders are preferably provided with the ordinary bushing or linings D' and G', the lining D' being provided with longitudinal slots $D^2$, opening into the annular chamber E.

Within the cylinder D is placed a piston-valve comprising the connected heads I and I', which in the mid-position of the valve are arranged upon opposite sides of the annular chamber, cutting off communication between the main chest and the pipe F on the one side and the pipe F and the exhaust-pipe $D^3$ on the other side.

$I^3$ is a piston on the cylinder G, connected with the piston-valve. I preferably form the piston-valve and piston $I^3$ as shown in the drawings, in which $a$ and $b$ are tubular stems, having integrally formed therewith the heads $a'\ a^2$ and $b'\ b^2$, respectively. The heads $a^2$ and $b'$ together form the piston-head I'. The head $a'$, together with the head or disk $c$, forms the piston-head I, and the head $b^2$ and a disk $d$ form the piston $I^3$. Between each pair of heads is clamped a cup-shaped packing $e$, and the whole is secured together by the central bolt $f$ and nuts $g$.

J is a valve-seat within the chest A. J' and $J^2$ are ports therein, the former leading to the outer end of the cylinder G and the latter to the exhaust-pipe $D^3$. These ports are controlled by a two-part valve, one member of which I shall hereinafter designate as the "pilot-valve" and the other member as the "cut-off." The two members are arranged to have a cross sliding movement in relation to each other, the pilot-valve being connected with the controlling-cable in the elevator-shaft and the cut-off having a connection with the main valve or piston, so as to be automatically operated thereby.

In the construction shown in Figs. 1, 2, 3, and 4 of the drawings a rotary valve K is used for the pilot and a slide-valve L for the cut-off. The cut-off is provided with ports L' $L^2$, which, on the face in sliding contact with the valve-seat J, are elongated so as to register, respectively, with the ports J' and $J^2$ during the entire movement of the cut-off. The valve K is similar to a D-valve, having a central recess $K^2$, which communicates with the port $L^2$, and an eccentric curved edge or bearing K', adapted to cover the port L'. The stem of the valve passes out through a suitable stuffing-box M and is provided with a lever or rock-arm M', to which the controlling-cable $M^3$ is attached. The cut-off is connected to the main valve by means of the link N, connecting the cut-off and the short arm of the lever O, which latter is fulcrumed in the post P, secured in the wall of the chest. The long arm of the lever O is bifurcated to embrace the stem $b$ of the piston and is attached thereto by means of the pins Q, engaging with slotted bearings in said bifurcated end of the lever.

In Fig. 5 I have shown a modified form of valve in which the pilot S and cut-off T are both slide-valves, but move at right angles to each other.

The operation of the device is as follows: The parts being in the position shown in Fig. 1, the operator, by means of the connections described, moves the pilot-valve K. If he desires the elevator to ascend, the valve K is moved so as to disclose the port L', thus admitting water into the cylinder G behind the piston I³, which will balance the pressure on each side of said piston, allowing the pressure on the head I' of the piston-valve to move the valve. At the same time the movement of the piston is communicated, through the lever O and link N, to the cut-off L, which is brought into the position where the port L' is again covered, whereupon further movement of the piston will be arrested. Thus the amount of movement of the pilot always determines the movement of the main valve. This movement of the valve establishes communication between the water-chest and the lateral discharge through the slots D² and annular chamber E, thereby admitting water to the operating-cylinder of the elevator.

To make the elevator descend, the valve K is moved in the reverse direction, which connects the ports L' and L² through the recess K², allowing the water behind the piston I³ to exhaust through the port J². Now as the area of the head I⁸ is greater than that of the head I' the difference in pressure on the inner side of the two heads will move the main valve in the reverse direction, establishing communication between the pipe F and pipe D³ and allowing the water in the operating-cylinder to exhaust. The cut-off, operating in the same manner as before described, will regulate the degree of opening according to the movement of the pilot.

I deem it of great importance in my construction of valve that the pilot-valve and cut-off have a cross sliding movement in relation to each other, as all danger of the movement of one changing the position of the other is thereby avoided, while in other constructions heretofore in use, where both members of the controlling-valve move in the same direction, the action of the valve will be uncertain if there is the slightest degree of lost motion in the connection mechanism.

Another very important feature of my construction is that all the mechanism controlling the action of the cut-off is inclosed within the chest, thereby both simplifying the construction of parts and placing them where they cannot be tampered with.

What I claim as my invention is—

1. The combination of a water-chest having an inlet and an outlet passage, a piston-valve controlling said outlet-passage, a piston of greater area than said piston-valve, connected thereto and fitting a portion of the chest communicating at the forward side of the piston with the inlet-passage, a valve-seat in the main part of the chest, ports in said seat leading respectively to that portion of the chest behind the piston, and to an exhaust-passage and a two-part valve controlling said ports consisting of a pilot-valve, having means for operating it from outside the chest and an automatic cut-off, the latter being operatively connected with said piston.

2. The combination with a water chest or cylinder, and a piston therein adapted to operate the main valve of a hydraulic elevator, of a two-part valve controlling the movement of the piston comprising a pilot-valve and a cut-off arranged to have a cross sliding movement in relation to each other, said cut-off being operatively connected with the piston.

In testimony whereof I affix my signature in presence of two witnesses.

WILLIAM H. HULTGREN.

Witnesses:
M. B. O'DOGHERTY,
O. F. BARTHEL.